(12) United States Patent
Cheng et al.

(10) Patent No.: US 12,554,568 B2
(45) Date of Patent: Feb. 17, 2026

(54) METHOD FOR CONTROLLING BASEBOARD MANAGEMENT CONTROLLER OF NODE SERVER AND SYSTEM THEREOF

(71) Applicant: Suzhou MetaBrain Intelligent Technology Co., Ltd., Jiangsu (CN)

(72) Inventors: Ziqiang Cheng, Jiangsu (CN); Dongshun Tian, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 19/115,729

(22) PCT Filed: Aug. 28, 2024

(86) PCT No.: PCT/CN2024/115001
§ 371 (c)(1),
(2) Date: Mar. 26, 2025

(87) PCT Pub. No.: WO2025/045061
PCT Pub. Date: Mar. 6, 2025

(65) Prior Publication Data
US 2026/0003706 A1    Jan. 1, 2026

(30) Foreign Application Priority Data
Aug. 28, 2023    (CN) .......................... 202311087332.3

(51) Int. Cl.
G06F 11/07    (2006.01)
(52) U.S. Cl.
CPC ...... G06F 11/0757 (2013.01); G06F 11/0721 (2013.01)

(58) Field of Classification Search
CPC .......................... G06F 11/0757; G06F 11/0721
(Continued)

(56) References Cited

U.S. PATENT DOCUMENTS

2020/0065273 A1    2/2020    Bouda et al.
2022/0398144 A1*   12/2022   Cho .................. G06F 11/0721

FOREIGN PATENT DOCUMENTS

CN    108038019 A    5/2018
CN    109656739 A    4/2019
(Continued)

OTHER PUBLICATIONS

International Search Report of corresponding PCT application (PCT/CN2024/115001) Nov. 20, 2024, 8 pages.
(Continued)

*Primary Examiner* — Yair Leibovich
(74) *Attorney, Agent, or Firm* — Cooper Legal Group, LLC (57) ABSTRACT

The present application relates to a method for controlling a baseboard management controller of a node server, a system, and a complex programmable logic device, including: detecting a signal emitted by a watchdog timer of the baseboard management controller, and restarting the baseboard management controller in response to detecting that the signal emitted by the watchdog timer is a non-square wave signal; and in response to receiving a remote reset signal of the baseboard management controller transmitted by a network interface card, identifying whether the baseboard management controller requires a restart, and if so, restarting the baseboard management controller.

20 Claims, 5 Drawing Sheets

(58) Field of Classification Search
USPC .......................................................... 714/16
See application file for complete search history.

(56) References Cited

FOREIGN PATENT DOCUMENTS

| | | |
|---|---|---|
| CN | 110032462 A | 7/2019 |
| CN | 111694710 A | 9/2020 |
| CN | 114691408 A | 7/2022 |
| CN | 115097900 A | 9/2022 |
| CN | 115145381 A | 10/2022 |
| CN | 116820827 A | 9/2023 |

OTHER PUBLICATIONS

Written Opinion of International Searching Authority of corresponding PCT application (PCT/CN2024/115001) Nov. 20, 2024, 9 pages.
First Office Action of corresponding CN priority application (CN202311087332.3) Oct. 9, 2023, 13 pages.
Second Office Action of corresponding CN priority application (CN202311087332.3) Oct. 30, 2023, 19 pages.
Notification to Grant Patent Right for Invention of corresponding CN priority application (CN202311087332.3) Nov. 20, 2023, 3 pages.

\* cited by examiner

METHOD FOR CONTROLLING BASEBOARD MANAGEMENT CONTROLLER OF NODE SERVER AND SYSTEM THEREOF

CROSS-REFERENCE TO RELATED APPLICATION

This application claims the priority of the Chinese patent application filed on Aug. 28, 2023 before the CNIPA, China National Intellectual Property Administration with the application number of 202311087332.3 and the title of "Method for Controlling Baseboard Management Controller of Node Server and System Thereof", which is incorporated herein in its entirety by reference.

FIELD

The present application relates to the technical field of digital chips, and more particularly, to a method for controlling a baseboard management controller of a node server, a system, and a complex programmable logic device.

BACKGROUND

Server clusters typically utilize BMC (Baseboard Management Controller) commands to execute large-scale unattended operations, including remote management, monitoring, installation, and restarting of servers. As a core management assembly of the server, a working state of the baseboard management controller directly impacts a working stability of the server and background operation and maintenance activities. If the baseboard management controller of the node server malfunctions, a majority of the operation and maintenance are performed remotely.

Therefore, it is necessary to provide a stable and reliable measure for remotely restarting a baseboard management controller of a node server, ensuring that the baseboard management controller can resume normal operation by remotely restarting the baseboard management controller when a failure occurs in the baseboard management controller.

SUMMARY

A method for controlling a baseboard management controller of a node server, wherein the method for controlling a baseboard management controller of a node server is implemented in a complex programmable logic device, the complex programmable logic device is connected to the baseboard management controller, the complex programmable logic device is further connected to a network interface card, and the method includes: detecting a signal emitted by a watchdog timer of the baseboard management controller, and restarting the baseboard management controller in response to detecting that the signal emitted by the watchdog timer is a non-square wave signal; and in response to receiving a remote reset signal of the baseboard management controller transmitted by the network interface card, identifying whether the baseboard management controller requires a restart, and in response to identifying that the baseboard management controller requires the restart, restarting the baseboard management controller.

In one embodiment, the method for controlling a baseboard management controller of a node server further includes: in response to detecting that the signal emitted by the watchdog timer is a continuous low-level signal or high-level signal, determining that the signal emitted by the watchdog timer is detected to be the non-square wave signal.

In one embodiment, the restarting the baseboard management controller includes: transmitting a low-level signal to an external reset pin of the baseboard management controller to cause the baseboard management controller to be restarted.

In one embodiment, transmitting a low-level signal to an external reset pin of the baseboard management controller to cause the baseboard management controller to be restarted includes: continuously transmitting the low-level signal to the external reset pin of the baseboard management controller within a predetermined time period, such that the baseboard management controller is restarted upon detecting the continuous low-level signal within the predetermined time period.

In one embodiment, the complex programmable logic device is in communication connection with a reserved pin of the network interface card, and the network interface card transmits the remote reset signal to the complex programmable logic device through the reserved pin.

In one embodiment, the network interface card transmits a pulse signal to the complex programmable logic device through the reserved pin, and a low-level signal in the pulse signal is the remote reset signal.

In one embodiment, the method for controlling a baseboard management controller of a node server further includes: receiving the pulse signal transmitted by the network interface card, and performing a filtering process on the pulse signal to obtain the low-level signal in the pulse signal.

In one embodiment, the method for controlling a baseboard management controller of a node server further includes: in response to detecting that the signal emitted by the watchdog timer is a non-square wave signal, setting a state flag bit of the baseboard management controller to a first identifier; in response to detecting that the signal emitted by the watchdog timer is a square wave signal, setting the state flag bit of the baseboard management controller to a second identifier; in response to identifying that the state flag bit of the baseboard management controller is the first identifier, determining that the baseboard management controller requires a restart; and in response to identifying that the state flag bit of the baseboard management controller is the second identifier, determining that the baseboard management controller does not require the restart.

In one embodiment, the network interface card is further connected to a processor of the node server through a PCIE bus, and the processor of the node server is connected to the baseboard management controller through the PCIE bus; and the network interface card executes an IPMI instruction through the processor of the node server to restart the baseboard management controller.

In one embodiment, the baseboard management controllers are provided in a plurality, the network interface cards are provided in a plurality, the complex programmable logic device is respectively connected to each of the baseboard management controllers, and the complex programmable logic device is also respectively connected to each of the network interface cards; the restarting the baseboard management controller in response to detecting that the signal emitted by the watchdog timer is a non-square wave signal includes: restarting any one of the baseboard management controllers in response to detecting that the signal emitted by the watchdog timer of any one of the baseboard management controllers is a non-square wave signal; and the in response to receiving a remote reset signal of the baseboard management controller transmitted by the network interface card, identifying whether the baseboard management controller requires a restart, and in response to identifying that the baseboard management controller requires the restart, restarting the baseboard management controller includes: in response to receiving the remote reset signal transmitted by any one of the network interface cards, identifying the baseboard management controller corresponding to the remote reset signal, identifying whether the corresponding baseboard management controller requires the restart, and in response to identifying that the corresponding baseboard management controller requires the restart, restarting the corresponding baseboard management controller.

A complex programmable logic device, wherein the complex programmable logic device is connected to a baseboard management controller of a node server, and the complex programmable logic device is further connected to a network interface card, wherein the complex programmable logic device is provided therein with a storage unit, a processing unit, and a computer-readable instruction stored in the storage unit and executable on the processing unit, and the processing unit, when executing the computer-readable instruction, implements a step of the method described in any one of the foregoing contents.

A system for controlling a baseboard management controller of a node server, wherein the system for controlling a baseboard management controller of a node server includes a complex programmable logic device and a network interface card, the network interface card is connected to the complex programmable logic device, and the complex programmable logic device is further connected to the baseboard management controller, wherein the complex programmable logic device is configured for detecting a signal emitted by a watchdog timer of the baseboard management controller, and restarting the baseboard management controller in response to detecting that the signal emitted by the watchdog timer is a non-square wave signal; and the complex programmable logic device is configured for in response to receiving a remote reset signal of the baseboard management controller transmitted by the network interface card, identifying whether the baseboard management controller requires a restart, and in response to identifying that the baseboard management controller requires the restart, restarting the baseboard management controller.

In one embodiment, the network interface card is further connected to a processor of the node server, all PCIE links of the network interface card are connected to a PCIE port of the processor of the node server, and the processor of the node server is connected to the baseboard management controller through a PCIE bus; and the network interface card executes an IPMI instruction through the processor of the node server to restart the baseboard management controller.

In one embodiment, a golden finger of the network interface card is connected to the PCIE port of the node server, and the PCIE bus of the node server is connected to the PCIE port of the processor of the node server.

In one embodiment, the network interface card emits a sideband signal of the golden finger to the complex programmable logic device through a reserved pin of the network interface card, and the sideband signal of the golden finger functions as the remote reset signal.

In one embodiment, the network interface card is a multi-channel network interface card, the network interface cards are provided in a plurality, each of the network interface cards is respectively connected to the complex programmable logic device, each of the network interface cards is further connected to a plurality of baseboard management controllers, and the complex programmable logic device is respectively connected to each of the baseboard management controllers; the complex programmable logic device detects that the signal emitted by the watchdog timer of any one of the baseboard management controllers is a non-square wave signal, and restarts the any one of the baseboard management controllers; and when receiving a remote reset signal transmitted by any one of the network interface cards, the complex programmable logic device identifies the baseboard management controller corresponding to the remote reset signal, identifies whether the corresponding baseboard management controller requires a restart, and in response to identifying that the baseboard management controller requires the restart, restarts the corresponding baseboard management controller.

In one embodiment, a golden finger of each of the network interface cards is inserted into a PCIE port of an adapter board, the adapter board splits a PCIE bus into a plurality of PCIE lines through a cable and is connected to the PCIE port of a processor of each node server through each of the PCIE lines, and the processor of each node server is connected to a corresponding baseboard management controller through the PCIE bus.

In one embodiment, the network interface cards are provided in two, the golden fingers of both the two network interface cards are inserted into the PCIE ports of the adapter board, and the adapter board splits a PCIE X16 bus of each of the network interface cards into two PCIE X8 lines through a cable, with each PCIE X8 line connected to the PCIE port of the processor of one node server.

In one embodiment, any one of the network interface cards transmits a sideband signal of the golden finger of the any one of the network interface cards to the complex programmable logic device through a reserved pin of the any one of the network interface cards, and the sideband signal of the golden finger of the any one of the network interface cards functions as the remote reset signal emitted by the any one of the network interface cards.

In one embodiment, the system for controlling a baseboard management controller of a node server further includes a management switch connected to the network interface card, and the management switch is configured to control the network interface card to emit the remote reset signal.

DETAILED DESCRIPTION

In order that the objects, aspects, and advantages of the present application will become more apparent, the technical solutions of the embodiments of the present application will now be described more clearly and fully hereinafter with reference to the accompanying drawings, in which embodiments of the application are shown. It is to be understood that the embodiments described are only a few, but not all embodiments of the application. Based on the embodiments of the present application, all other embodiments obtained by a person of ordinary skill in the art without inventive effort fall within the scope of protection of the present application.

It should be understood that in the description of the present application, unless the context clearly dictates otherwise, terms throughout the specification, such as "include", "contain", and the like are to be interpreted in an inclusive sense rather than an exclusive or exhaustive sense; that is, they are to be construed as "including but not limited to".

It should be understood that the terms "first", and "second" are used for descriptive purposes only and are not to be construed as indicating or implying relative importance. Furthermore, in the description of the present application, the meaning of "plurality" is two or more, unless indicated otherwise.

It should be noted that the terms "S1", "S2", and the like are used solely for the purpose of describing steps and are not intended to denote any specific order or sequence, nor to limit the present application. They are merely used for convenience in describing the methods of the present application and should not be construed as indicating any sequential or chronological order of the steps. In addition, the technical solutions of the various embodiments may be combined with each other, provided that such combination can be implemented by a person skilled in the art. If the combination of technical solutions results in contradictions or is unfeasible, it shall be deemed that such combination of technical solutions does not exist and is not within the scope of protection claimed in the present application.

Figure 1:
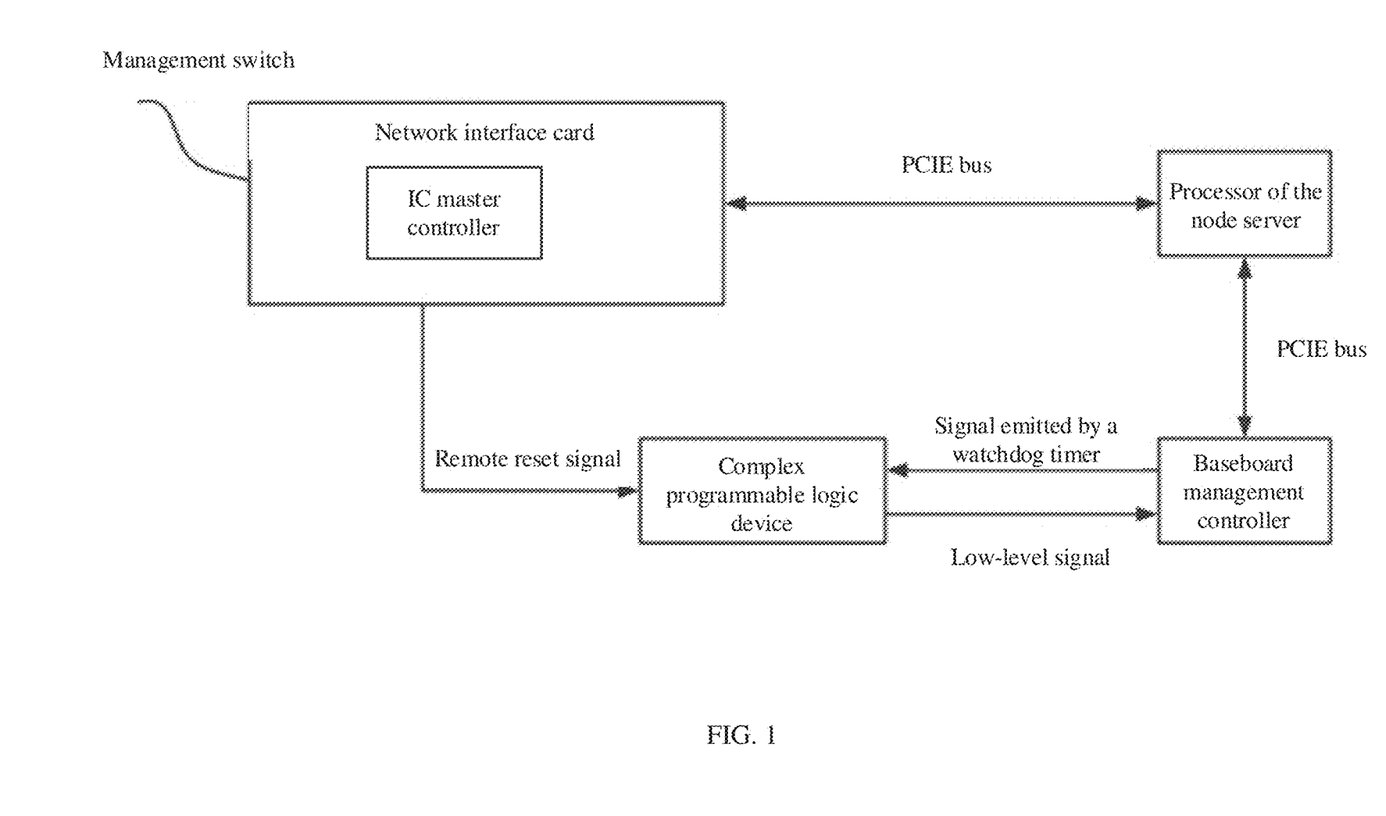
FIG. 1 is a structural block diagram of a system for controlling a baseboard management controller of a node server in one or more embodiments.

A system for controlling a baseboard management controller of a node server is provided in the present application. As shown in FIG. 1, the system for controlling a baseboard management controller of a node server includes a complex programmable logic device and a network interface card, the network interface card is connected to the complex programmable logic device, and the complex programmable logic device is further connected to the baseboard management controller, wherein the complex programmable logic device is configured for detecting a signal emitted by a watchdog timer of the baseboard management controller, and restarting the baseboard management controller in response to detecting that the signal emitted by the watchdog timer is a non-square wave signal; and the complex programmable logic device is configured for in response to receiving a remote reset signal of the baseboard management controller transmitted by the network interface card, identifying whether the baseboard management controller requires a restart, and if so, restarting the baseboard management controller. Therefore, it is possible to remotely detect problems with the baseboard management controller of the node server and restart the baseboard control manager, ensuring that the baseboard control manager can be remotely restarted when the baseboard management controller fails.

In one embodiment, as shown in FIG. 1, the network interface card is further connected to the processor of the node server, wherein all PCIE links of the network interface card are connected to the PCIE port of the processor of the node server, and the processor of the node server is connected to the baseboard management controller through the PCIE bus; and the network interface card executes an IPMI instruction through the processor of the node server to restart the baseboard management controller.

Specifically, all PCIE links of a PCIE network interface card are all connected to the PCIE ports of the processor of the same node server, such that one network interface card communicates only with the processor of one node server, i.e., the network interface card is responsible for managing only one node server. PCIE(peripheral component interconnect express) is a high-speed serial computer expansion bus standard. The PCIE link is either PCIE X8 or X16.

In one embodiment, a golden finger of the network interface card is connected to the PCIE port of the node server, and the PCIE bus of the node server is connected to the PCIE port of the processor of the node server.

Specifically, a network interface of the network interface card is connected to a network interface of the management switch through a network cable or an optical fiber, the golden finger of the network interface card is inserted into a PCIE slot of the server and connected to the processor of the node server through the PCIE bus, and the baseboard management controller of the node server is further connected to the processor through the PCIE bus. Therefore, background operation and maintenance can remotely log in to an operating system of the server and execute the IPMI instruction under the operating system to restart the baseboard management controller of the node server. IPMI is a group of interactive standard management specifications. The core component of IPMI is the baseboard management controller, which can interact with the CPU, BIOS, and other components through the IPMI instructions.

In one embodiment, the network interface card emits a sideband signal of the golden finger to the complex programmable logic device through a reserved pin of the network interface card, and the sideband signal of the golden finger functions as the remote reset signal.

Specifically, the golden finger of the network interface card is connected to the complex programmable logic device through one reserved pin, and a sideband signal is transmitted to the complex programmable logic device to serve as the remote reset signal.

In one embodiment, the network interface card is a multi-channel network interface card, the network interface cards are provided in a plurality, each of the network interface cards is respectively connected to the complex programmable logic device, each of the network interface cards is further connected to a plurality of baseboard management controllers, and the complex programmable logic device is respectively connected to each of the baseboard management controllers; the complex programmable logic device detects that the signal emitted by the watchdog timer of any one of the baseboard management controllers is a non-square wave signal, and restarts the any one of the baseboard management controllers; and when receiving a remote reset signal transmitted by any one of the network interface cards, the complex programmable logic device identifies the baseboard management controller corresponding to the remote reset signal, identifies whether the corresponding baseboard management controller requires a restart, and if so, restarts the corresponding baseboard management controller. A golden finger of each of the network interface cards is inserted into a PCIE port of an adapter board, the adapter board splits a PCIE bus into a plurality of PCIE lines through a cable and is connected to the PCIE port of a processor of each node server through each of the PCIE lines, and the processor of each node server is connected to a corresponding baseboard management controller through the PCIE bus.

In one embodiment, the network interface cards are provided in two, the golden fingers of both the two network interface cards are inserted into the PCIE ports of the adapter board, and the adapter board splits a PCIE X16 bus of each of the network interface cards into two PCIE X8 lines through a cable, with each PCIE X8 line connected to the PCIE port of the processor of one node server.

In one embodiment, any one of the network interface cards transmits a sideband signal of the golden finger of the any one of the network interface cards to the complex programmable logic device through a reserved pin of the any one of the network interface cards, and the sideband signal of the golden finger of the any one of the network interface cards functions as the remote reset signal emitted by the any one of the network interface cards.

Specifically, the system for controlling a baseboard management controller of a node server further includes a management switch connected to the network interface card, and the management switch is configured to control the network interface card to emit the remote reset signal.

Figure 2:
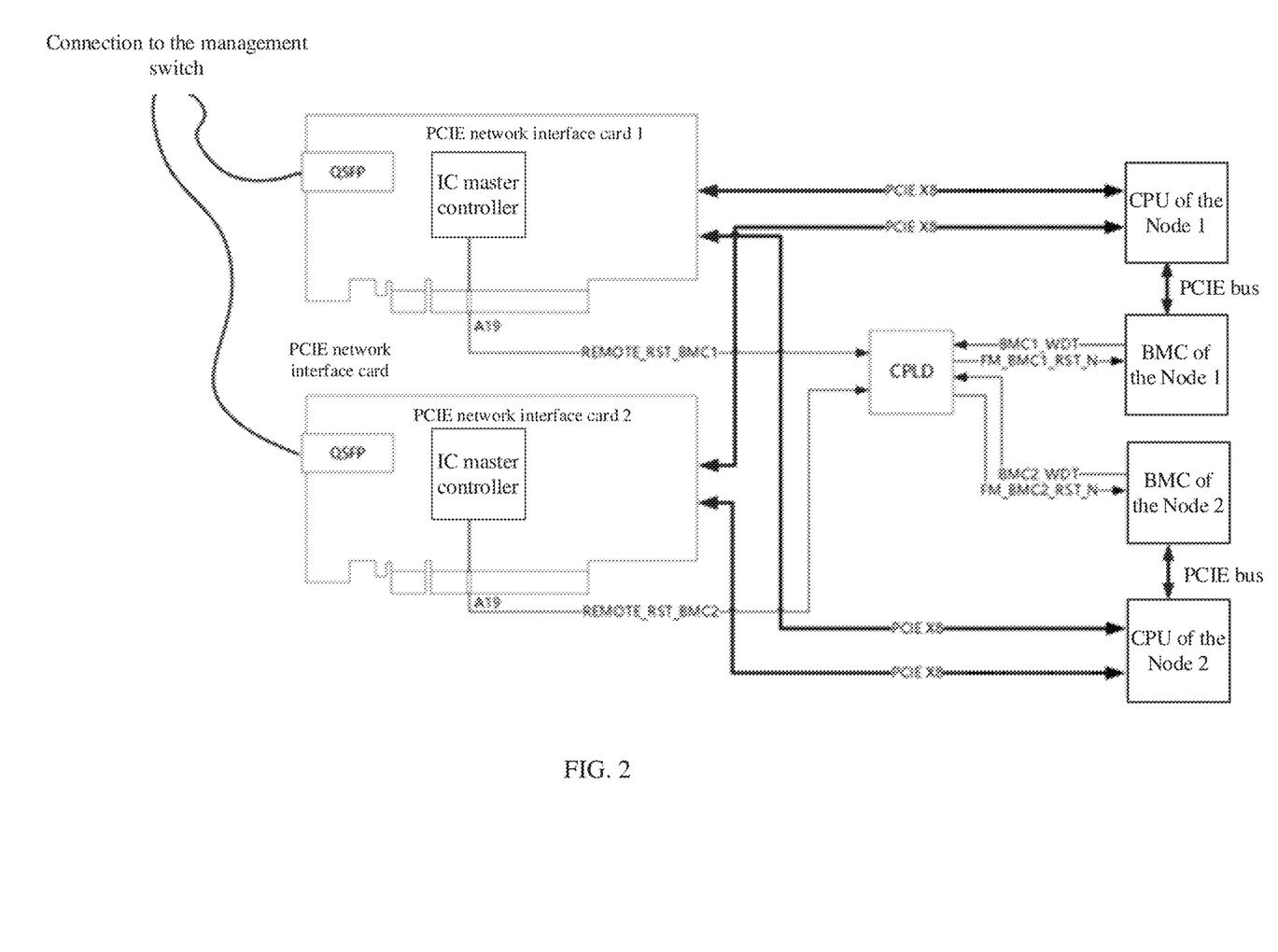
FIG. 2 is a schematic diagram of circuit connection of a restart of the baseboard management controller of a remote controlled node server in one or more embodiments.

Specifically, as illustrated in FIG. 2, the plurality of network interface cards include a PCIE network interface card 1 and a PCIE network interface card 2, wherein each network interface card is equipped with an IC master controller. Both the PCIE network interface card 1 and the PCIe network interface card 2 are connected to a CPLD (complex programmable logic device) through their internal IC master controllers. Both the PCIE network interface card 1 and the PCIE network interface card 2 support PCIE X16 bandwidth, which can be split into two PCIE X8s. These two PCIE X8s are respectively connected to the processors of two different node servers. As illustrated in FIG. 2, namely a CPU of a Node 1 and a CPU of a Node 2, one single network interface card is capable of managing two node servers.

The golden fingers of the PCIE network interface card 1 and the PCIE network interface card 2 are inserted into the standard PCIE ports of the adapter board. The adapter board splits the PCIE X16 into two PCIE X8s through a cable, which two PCIE X8s are respectively connected to PCIE ports of CPUs of two different nodes. The golden fingers of the two network interface cards utilize the reserved pins to transmit a REMOTE_RST_BMC1 signal and a REMOTE_RST_BMC2 signal to the CPLD, respectively. The REMOTE_RST_BMC1 signal and the REMOTE_RST_BMC2 signal are the sideband signals of the golden fingers of two network interface cards, respectively, and both serve as corresponding remote reset signals. The REMOTE_RST_BMC1 signal and the REMOTE_RST_BMC2 signal are both pulse signals, wherein the low level in the pulse signal serves as an effective remote reset signal.

The CPLD performs a filtering process on the REMOTE_RST_BMC1 signal to emit an FM_BMC1_RST_N signal to the BMC of node 1, and performs the filtering process on the REMOTE_RST_BMC2 signal to emit an FM_BMC2_RST_N signal to the BMC of node 2. Specifically, the CPLD is respectively connected to the external reset pins of the BMC of the Node 1 and the BMC of the Node 2. The BMC of the Node 1 receives the FM_BMC1_RST_N signal through the external reset pin, and the BMC of the Node 2 receives the FM_BMC2_RST_N signal through the external reset pin. The FM_BMC1_RST_N signal and the FM_BMC2_RST_N signal are corresponding trigger signals, respectively, and the trigger signals are low-level signals.

The BMC of the Node 1 emits the BMC1_WDT signal to the CPLD. A BMC1_WDT signal is a signal emitted by the watchdog timer within the BMC of Node 1. When the BMC1_WDT signal remains a square-wave pulse, the CPLD considers that the BMC at node 1 is functioning normally. When the BMC1_WDT signal remains at a low level or a high level continuously without any change, the CPLD considers that the BMC of the Node 1 has hung. Similarly, the situation of the BMC of the Node 1 is analogized.

When the CPLD detects that the BMC1_WDT signal remains a square wave pulse continuously, the internal flag bit flag_bmc1_alive is set to 1; and when the CPLD detects that the BMC1_WDT signal remains at a low level or a high level without any change, the internal flag bit flag_bmc1_alive is cleared to zero. The CPLD processes the BMC2_WDT signal in a similar manner.

As illustrated in FIG. 2, when the PCIE network interface card 1 emits the REMOTE_RST_BMC1 signal and maintains it for a predetermined duration, the CPLD, upon detection, will initially evaluate a value of the internal flag bit flag_bmc1_alive.

When the internal flag bit flag_bmc1_alive is set to 1, the BMC of the node 1 corresponding to this flag bit does not restart; when flag_bmc1_alive is set to 0, the CPLD pulls down the FM_BMC1_RST_N signal corresponding to this BMC of the Node 1, thereby pulling down the external reset pin of the BMC of the Node 1, restarting the BMC of the Node 1 and performing a device reset. By analogy, the information exchange process between the PCIE network interface card 2 and the CPLD is inferred.

The aforementioned system for controlling a baseboard management controller of a node server does not utilize a PCIE network interface card in-band or a BMC RJ45 network to remotely restart the baseboard management controller. Instead, the system employs a reserved pin within the non-PCIE protocol specification of the PCIE network interface card as a general-purpose input/output (GPIO) to emit a restart signal for the baseboard management controller. The GPIO signal is stable and reliable, and is not restricted by the OS permissions or the working state of the baseboard management controller.

The CPLD utilizes the signal generated by the watchdog timer of the baseboard management controller as a filtering criterion. When the signal from the watchdog timer is a square wave, it indicates that the baseboard management controller is functioning normally. Even if a restart signal is emitted remotely, the baseboard management controller will not be restarted, thereby ensuring uninterrupted working of the baseboard management controller. Only when the signal emitted from the watchdog timer is not a square wave will the CPLD accept the remote restart signal and subsequently pull down the external reset pin of the baseboard management controller of a corresponding node to restart the baseboard management controller.

This design leverages an existing hardware configuration of the server, which inherently includes a network interface card, a baseboard management controller, and a complex programmable logic device (CPLD) chip. By merely modifying the general-purpose input/output (GPIO) design, the remote controlled node server can be restarted without the need for additional hardware consumption, thereby reducing costs.

The system for controlling a baseboard management controller of a node server in the above-mentioned embodiment has the following technical effects (1) Potential Market BMC plays a crucial role in the server and is an essential component in the server, and thus the present application has extensive application prospects and significant market potential.

(2) Value of the Solution

The application effectively addresses the issue of remotely restarting the BMC of the server, significantly alleviates the operational and maintenance burden, reduces on-line work orders, and minimizes manpower investment.

(3) Cost Reduction

The application is based on existing hardware and does not require additional hardware investment, thereby reducing costs compared to other complex solutions.

(4) Advancement

The application utilizes the collaboration of conventional hardware components, including a network interface card, a baseboard management controller (BMC), and a complex programmable logic device (CPLD), to achieve remote BMC restart, thereby reducing server maintenance costs and significantly enhancing the competitiveness of server products.

(5) Inventiveness

By utilizing the Reserved PIN of the network interface card in conjunction with the BMC and the CPLD, the remote restart of the BMC of the server is achieved, which can be applied to scenarios involving single or multiple nodes. This solution offers enhanced stability and applicability compared to traditional approaches, demonstrating a certain degree of innovation.

(6) Feasibility

The solution described in the present application can be readily implemented through hardware wiring connections and the coordination of the BMC and CPLD.

Figure 3:
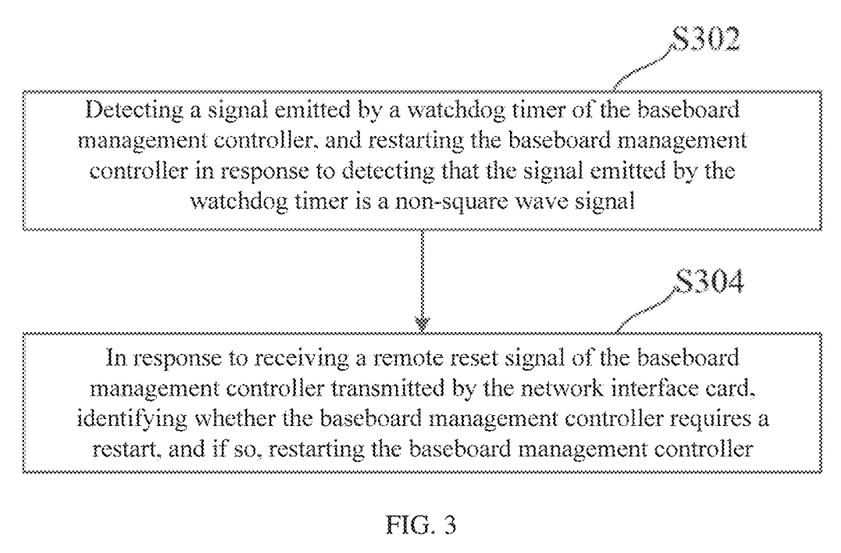
FIG. 3 is a schematic flow diagram of a method for controlling a baseboard management controller of a node server in one or more embodiments.

The present application further provides a method for controlling a baseboard management controller of a node server, applied to the complex programmable logic device shown in FIG. 1. As shown in FIG. 3, a method for controlling a baseboard management controller of a node server includes the following steps:

In S302, a signal emitted by a watchdog timer of the baseboard management controller is detected, and the baseboard management controller is restart in response to detecting that the signal emitted by the watchdog timer is a non-square wave signal.

In one embodiment, after detecting the signal emitted by the watchdog timer of the baseboard management controller, the method further includes: in response to detecting that the signal emitted by the watchdog timer is a continuous low-level signal or high-level signal, determining that the signal emitted by the watchdog timer is a non-square wave signal.

In S304, in response to receiving a remote reset signal of the baseboard management controller transmitted by the network interface card, it is identified whether the baseboard management controller requires a restart, and if so, the baseboard management controller is restarted.

In one embodiment, the restarting the baseboard management controller includes: transmitting a low-level signal to an external reset pin of the baseboard management controller to cause the baseboard management controller to be restarted.

Transmitting a low-level signal to an external reset pin of the baseboard management controller to cause the baseboard management controller to be restarted includes: continuously transmitting the low-level signal to the external reset pin of the baseboard management controller within a predetermined time period, such that the baseboard management controller is restarted upon detecting the continuous low-level signal within the predetermined time period.

In one embodiment, prior to determining whether the baseboard management controller requires a restart, the method further includes: in response to detecting that the signal emitted by the watchdog timer is a non-square wave signal, setting a state flag bit of the baseboard management controller to a first identifier; in response to detecting that the signal emitted by the watchdog timer is a square wave signal, setting the state flag bit of the baseboard management controller to a second identifier; in response to identifying that the state flag bit of the baseboard management controller is the first identifier, determining that the baseboard management controller requires a restart; and in response to identifying that the state flag bit of the baseboard management controller is the second identifier, determining that the baseboard management controller does not require the restart.

In particular, the baseboard management controller of the node server emits a BMC_WDT (a watchdog timer, a component of a single chip microcomputer) signal to the complex programmable logic device. When the signal is a continuously emitted square wave pulse, the complex programmable logic device considers that the baseboard management controller is functioning normally. When this signal continuously remains at a low level or a high level without any change, the complex programmable logic device considers that the baseboard management controller has hung, and initiates a restart of the baseboard management controller.

When the complex programmable logic device detects that the BMC_WDT signal continuously remains a square wave, it sets the internal flag bit flag_bmc_alive to 1, i.e., the second identifier is flag bit 1. At this point, even if the network interface card transmits a remote reset signal of the baseboard management controller, the complex programmable logic device will not respond, meaning it will not pull down the external reset pin of the baseboard management controller, and the baseboard management controller will not restart.

When the complex programmable logic device detects that the BMC_WDT signal is a non-square wave signal, i.e., continuously remains at a low level or a high level without any change, the internal flag bit flag_bmc_alive is cleared to zero, i.e., the first identifier is flag bit 0. At this point, when the network interface card emits the remote reset signal of the baseboard management controller, the complex programmable logic device will respond by pulling down the external reset pin of the baseboard management controller, thereby causing the baseboard management controller to restart. Specifically, the complex programmable logic device emits a low pulse signal to the baseboard management controller for a predetermined duration, which is determined by the requirement of the reset pin of the chip of the baseboard management controller. This involves pulling down the external reset pin of the baseboard management controller for a specified duration, thereby causing the baseboard management controller to restart and the equipment to be reset.

Therefore, by utilizing the complex programmable logic device, a failure of the baseboard management controller can be automatically detected and the baseboard management controller can be automatically restarted. Additionally, the remote reset signal remotely transmitted can be received through the network interface card, and the baseboard management controller can be restarted based on the remote reset signal and the state indicating whether the baseboard management controller requires a restart. Therefore, it is possible to remotely detect problems with the baseboard management controller of the node server and restart the baseboard control manager, ensuring that the baseboard control manager can be remotely restarted when the baseboard management controller fails.

In one embodiment, the complex programmable logic device is in communication connection with a reserved pin of the network interface card, and the network interface card transmits the remote reset signal to the complex programmable logic device through the reserved pin. The network interface card transmits a pulse signal to the complex programmable logic device through the reserved pin, and a low-level signal in the pulse signal is the remote reset signal.

In one embodiment, prior to the aforementioned step S304, the method further includes: receiving the pulse signal transmitted by the network interface card, and performing a filtering process on the pulse signal to obtain the low-level signal in the pulse signal.

Specifically, the golden finger of the network interface card utilizes the reserved pin to transmit the pulse signal to the complex programmable logic device, wherein the low level in the pulse signal constitutes a valid signal. That is, the low-level signal in the pulse signal functions as the remote reset signal. The complex programmable logic device performs a filtering process on the pulse signal to extract the low-level signal in the pulse signal, and emits an FM_BMC_RST_N signal to the external reset pin of the baseboard management controller based on the extracted low-level signal in the pulse signal.

In one embodiment, as shown in FIG. 1, the network interface card is further connected to a processor of the node server through a PCIE bus, and the processor of the node server is connected to the baseboard management controller through the PCIE bus; and the network interface card executes an IPMI instruction through the processor of the node server to restart the baseboard management controller.

In one embodiment, the baseboard management controllers are provided in a plurality, the network interface cards are provided in a plurality, the complex programmable logic device is respectively connected to each of the baseboard management controllers, and the complex programmable logic device is also respectively connected to each of the network interface cards; the restarting the baseboard management controller in response to detecting that the signal emitted by the watchdog timer is a non-square wave signal includes: restarting any one of the baseboard management controllers in response to detecting that the signal emitted by the watchdog timer of any one of the baseboard management controllers is a non-square wave signal; and the in response to receiving a remote reset signal of the baseboard management controller transmitted by the network interface card, identifying whether the baseboard management controller requires a restart, and if so, restarting the baseboard management controller includes: in response to receiving the remote reset signal transmitted by any one of the network interface cards, identifying the baseboard management controller corresponding to the remote reset signal, identifying whether the corresponding baseboard management controller requires the restart, and if so, restarting the corresponding baseboard management controller.

Figure 4:
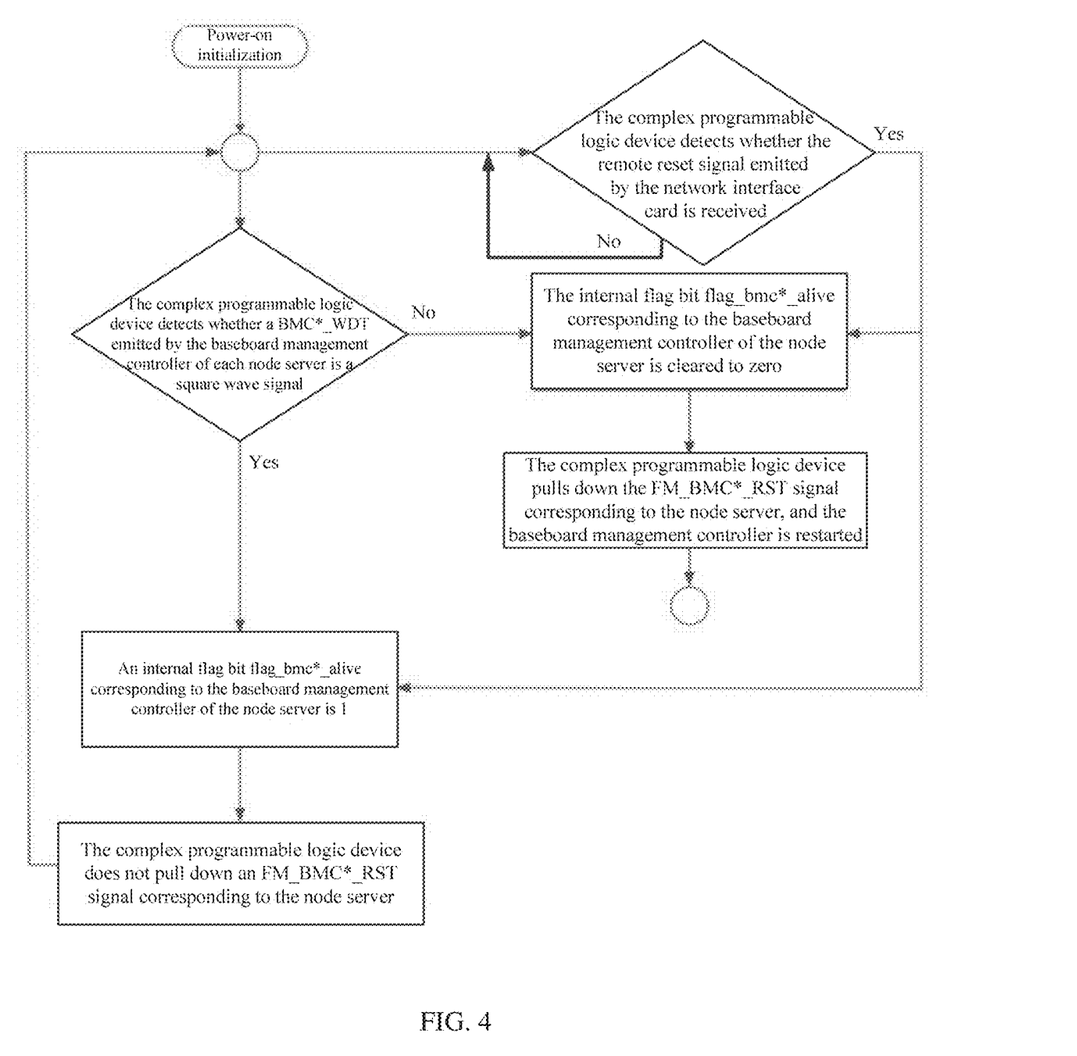
FIG. 4 is a schematic flow diagram of a restart of the baseboard management controller of a remote controlled node server in one or more embodiments.

The connection relationship between the plurality of baseboard management controllers, together with the plurality of network interface cards, and the complex programmable logic device is illustrated in FIG. 2. Specifically, two network interface cards and two baseboard management controllers are described as an example. As shown in FIG. 4:

1) After the entire system is powered on and started, the complex programmable logic device of the system detects whether each of the network interface cards pulls down the REMOTE_RST_BMC* signal. If the signal is not pulled down, the detection step is repeated; if it is detected that the REMOTE_RST_BMC* signal of any one of the network interface cards is pulled low, the process proceeds to the next step, step 3). Herein, the REMOTE_RST_BMC* signal refers to the remote reset signal emitted by a corresponding network interface card.

2) After the entire system is powered on, the complex programmable logic device of the system simultaneously detects whether the MC*_WDT signal emitted by the baseboard management controller of each node server is a square wave signal. If it is a square wave signal, the internal flag bit flag_bmc*_alive corresponding to the baseboard management controller of the node server is set to 1 within the complex programmable logic device; if not, and the BMC*_WDT signal remains at a high or low level without change, the flag_bmc*_alive corresponding to the internal flag bit of the baseboard management controller of the node server is cleared to zero within the complex programmable logic device. Herein, the BMC*_WDT signal refers to a signal emitted by the watchdog timer of the corresponding baseboard management controller.

3) If it is detected in step 1) that a REMOTE_RST_BMC* signal of any one of the network interface cards is pulled low, and the internal flag bit corresponding to the baseboard management controller of a certain node server is flag_bmc*_alive=0, then the complex programmable logic device pulls down the FM_BMC*_RST signal corresponding to the node server for a certain duration, causing the baseboard management controller of the node server to restart, the equipment is reset, and then it returns to the beginning to continue detecting the REMOTE_RST_BMC* signal and the BMC*_WDT signal. The FM_BMC*_RST signal refers to a trigger signal corresponding to the baseboard management controller, which is valid at a low level, i.e., the low level triggers the baseboard management controller to restart.

4) If it is detected in step 1) that the REMOTE_RST_BMC* signal of any one of the network interface cards is pulled low, but the internal flag bit of a certain node server is flag_bmc*_alive=1, the complex programmable logic device does not pull down the FM_BMC*_RST signal corresponding to the node server, the baseboard management controller of the node server does not restart, and then the process returns to the beginning to continue detecting the REMOTE_RST_BMC* signal and the BMC*_WDT signal.

The method for controlling a baseboard management controller of a node server in the aforementioned embodiment utilizes the reserved pin within a non-PCIE protocol specification of the network interface card to emit a restart signal of the baseboard management controller to the complex programmable logic device of the system. The complex programmable logic device of the system utilizes the signal emitted by the watchdog timer of the baseboard management controller as a locking condition. When the signal emitted by the watchdog timer is a square wave signal, it indicates that the baseboard management controller is operating normally. Even if a signal to restart the baseboard management controller is remotely emitted, the baseboard management controller will not be restarted, thereby ensuring uninterrupted working of the baseboard management controller. Only when the signal emitted by the watchdog timer is not a square wave signal will the complex programmable logic device of the system receive the remote reset signal, and subsequently pull down the external reset pin of the complex programmable logic device of a corresponding node server to restart the baseboard management controller.

The method for controlling a baseboard management controller of a node server in the above-mentioned embodiment has the following technical effects (1) Potential Market BMC plays a crucial role in the server and is an essential component in the server, and thus the present application has extensive application prospects and significant market potential.

(2) Value of the Solution

The application effectively addresses the issue of remotely restarting the BMC of the server, significantly alleviates the operational and maintenance burden, reduces on-line work orders, and minimizes manpower investment.

(3) Cost Reduction

The application is based on existing hardware and does not require additional hardware investment, thereby reducing costs compared to other complex solutions.

(4) Advancement

The application utilizes the collaboration of conventional hardware components, including a network interface card, a baseboard management controller (BMC), and a complex programmable logic device (CPLD), to achieve remote BMC restart, thereby reducing server maintenance costs and significantly enhancing the competitiveness of server products.

(5) Inventiveness

By utilizing the Reserved PIN of the network interface card in conjunction with the BMC and the CPLD, the remote restart of the BMC of the server is achieved, which can be applied to scenarios involving single or multiple nodes. This solution offers enhanced stability and applicability compared to traditional approaches, demonstrating a certain degree of innovation.

(6) Feasibility

The solution described in the present application can be readily implemented through hardware wiring connections and the coordination of the BMC and CPLD.

It should be understood that, although the various steps in the flow diagram are displayed sequentially as indicated by the arrows, these steps are not necessarily executed in the order indicated by the arrows. Unless expressly specified herein, the execution of these steps is not strictly limited to a particular order, and the steps may be performed in alternative sequences. Moreover, at least a portion of the steps in the flow diagram may include multiple sub-steps or stages, which are not necessarily executed simultaneously but may be performed at different moments. The execution sequence of these sub-steps or stages is not necessarily sequential and may be interleaved or alternated with at least a portion of other steps or the sub-steps or stages of other steps.

Figure 5:
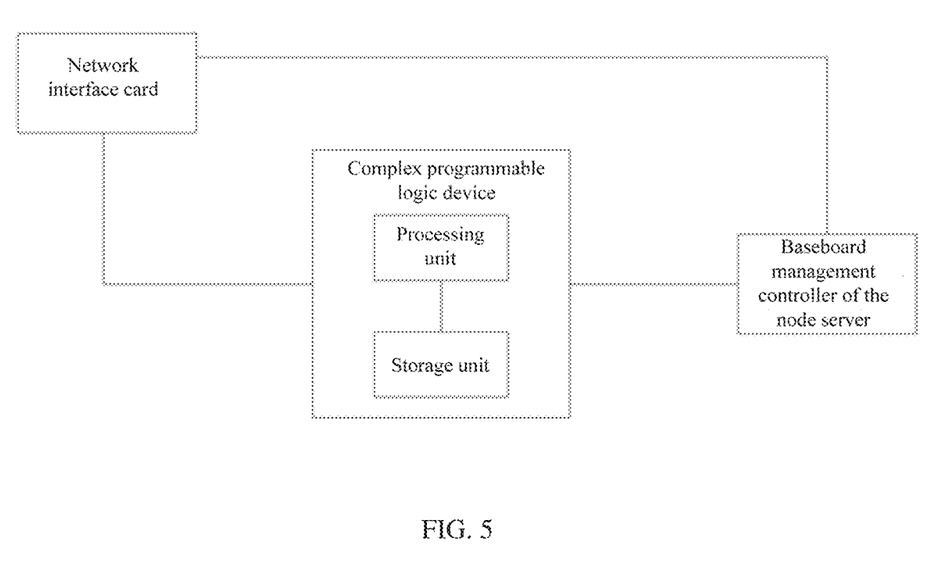
FIG. 5 is an internal structural diagram of a complex programmable logic device in one or more embodiments.

In one embodiment, a complex programmable logic device is provided. As illustrated in FIG. 5, the complex programmable logic device is connected to a baseboard management controller of a node server, and the complex programmable logic device is further connected to a network interface card, wherein the complex programmable logic device is provided therein with a storage unit, a processing unit, and a computer-readable instruction stored in the storage unit and executable on the processing unit. When the computer-readable instructions in the storage unit are executed by the processing unit, the method for controlling a baseboard management controller of a node server according to the present application is implemented.

A person skilled in the art can understand that the structure shown in FIG. 5 is only a block diagram of a part of the structure related to the present application, and does not constitute a limitation on a computer equipment to which the present application is applied. Specific computer equipment may include more or fewer components than shown in the figure, or combine certain components, or have different component arrangements.

In one embodiment, a complex programmable logic device is provided, wherein the complex programmable logic device is connected to a baseboard management controller of a node server, and the complex programmable logic device is further connected to a network interface card, wherein the complex programmable logic device is provided therein with a storage unit, a processing unit, and a computer-readable instruction stored in the storage unit and executable on the processing unit, and the processing unit, when executing the computer-readable instruction, implements a step of the following steps: detecting a signal from a watchdog timer of the baseboard management controller, and restarting the baseboard management controller in response to detecting that the signal emitted by the watchdog timer is a non-square wave signal; and in response to receiving a remote reset signal of the baseboard management controller transmitted by the network interface card, identifying whether the baseboard management controller requires a restart, and if so, restarting the baseboard management controller.

In one embodiment, the processing unit, when executing the computer-readable instruction, further performs the steps of: in response to detecting that the signal emitted by the watchdog timer is a continuous low-level signal or high-level signal, determining that the signal emitted by the watchdog timer is detected to be the non-square wave signal.

In one embodiment, when the processing unit executes the computer-readable instruction to implement the aforementioned step of restarting the baseboard management controller, the following steps are specifically performed: transmitting a low-level signal to an external reset pin of the baseboard management controller to cause the baseboard management controller to be restarted.

In one embodiment, when the processing unit executes computer-readable instruction to implement the aforementioned step of transmitting a low-level signal to an external reset pin of the baseboard management controller to cause the baseboard management controller to be restarted, the following steps are specifically implemented: continuously transmitting the low-level signal to the external reset pin of the baseboard management controller within a predetermined time period, such that the baseboard management controller is restarted upon detecting the continuous low-level signal within the predetermined time period.

In one embodiment, the complex programmable logic device is in communication connection with a reserved pin of the network interface card, and the network interface card transmits the remote reset signal to the complex programmable logic device through the reserved pin.

In one embodiment, the network interface card transmits a pulse signal to the complex programmable logic device through the reserved pin, and a low-level signal in the pulse signal is the remote reset signal.

In one embodiment, the processing unit, when executing the computer-readable instruction, further implements the steps of: receiving the pulse signal transmitted by the network interface card, and performing a filtering process on the pulse signal to obtain the low-level signal in the pulse signal.

In one embodiment, when executing the computer-readable instruction, the processing unit further performs the steps of: in response to detecting that the signal emitted by the watchdog timer is a non-square wave signal, setting a state flag bit of the baseboard management controller to a first identifier; in response to detecting that the signal emitted by the watchdog timer is a square wave signal, setting the state flag bit of the baseboard management controller to a second identifier; in response to identifying that the state flag bit of the baseboard management controller is the first identifier, determining that the baseboard management controller requires a restart; and in response to identifying that the state flag bit of the baseboard management controller is the second identifier, determining that the baseboard management controller does not require the restart.

In one embodiment, the network interface card is further connected to a processor of the node server through a PCIE bus, and the processor of the node server is connected to the baseboard management controller through the PCIE bus; and the network interface card executes an IPMI instruction through the processor of the node server to restart the baseboard management controller.

In one embodiment, the baseboard management controllers are provided in a plurality, the network interface cards are provided in a plurality, the complex programmable logic device is respectively connected to each of the baseboard management controllers, and the complex programmable logic device is also respectively connected to each of the network interface cards; when the processing unit executes the computer-readable instruction to implement the step of restarting the baseboard management controller in response to detecting that the signal emitted by the watchdog timer is a non-square wave signal, the following steps are specifically implemented: restarting any one of the baseboard management controllers in response to detecting that the signal emitted by the watchdog timer of any one of the baseboard management controllers is a non-square wave signal; and when the processing unit executes the computer-readable instruction to implement the step of in response to receiving a remote reset signal of the baseboard management controller transmitted by the network interface card, identifying whether the baseboard management controller requires a restart, and if so, restarting the baseboard management controller, the following steps are specifically implemented: in response to receiving the remote reset signal transmitted by any one of the network interface cards, identifying the baseboard management controller corresponding to the remote reset signal, identifying whether the corresponding baseboard management controller requires the restart, and if so, restarting the corresponding baseboard management controller.

A person skilled in the art can understand that implementing all or part of the processes in the above-mentioned methods in the embodiments can be accomplished by instructing relevant hardwares through computer-readable instructions, which can be stored in a non-volatile computer-readable storage medium. When executed, the computer-readable instructions may include the process of the embodiments of the above-mentioned various methods. In the various embodiments provided in the present application, any reference to memories, storages, databases, or other media that are used may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory can include a random access memory (RAM) or an external cache memory. By way of illustration and not limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features of the aforementioned embodiments may be combined in any manner. For the sake of brevity, not all possible combinations of the technical features in the aforementioned embodiments have been described. However, as long as there is no contradiction in the combination of these technical features, such combinations shall be deemed to fall within the scope of the present specification.

The above-mentioned embodiments only several implementations of the present application, and their descriptions are more specific and detailed, but should not be understood as limiting the scope of patent of the present disclosure. It should be noted that a person skilled in the art would have been able to make several variations and improvements without departing from the concepts of the present application, and these variations and improvements are also considered to be within the scope of protection of the present disclosure.

What is claimed is:

1. A method for controlling a baseboard management controller of a node server, wherein the method for controlling a baseboard management controller of a node server is implemented in a complex programmable logic device, the complex programmable logic device is connected to the baseboard management controller, the complex programmable logic device is further connected to a network interface card, and the method comprises:

detecting a signal emitted by a watchdog timer of the baseboard management controller, and restarting the baseboard management controller in response to detecting that the signal emitted by the watchdog timer is a non-square wave signal; and in response to receiving a remote reset signal of the baseboard management controller transmitted by the network interface card, identifying whether the baseboard management controller requires a restart, and in response to identifying that the baseboard management controller requires the restart, restarting the baseboard management controller;

wherein the baseboard management controllers are provided in a plurality, the network interface cards are provided in a plurality, the complex programmable logic device is respectively connected to each of the baseboard management controllers, and the complex programmable logic device is also respectively connected to each of the network interface cards;

wherein the restarting the baseboard management controller in response to detecting that the signal emitted by the watchdog timer is a non-square wave signal comprises: restarting any one of the baseboard management controllers in response to detecting that the signal emitted by the watchdog timer of any one of the baseboard management controllers is the non-square wave signal; and wherein the in response to receiving a remote reset signal of the baseboard management controller transmitted by the network interface card, identifying whether the baseboard management controller requires a restart, and in response to identifying that the baseboard management controller requires the restart, restarting the baseboard management controller comprises: in response to receiving the remote reset signal transmitted by any one of the network interface cards, identifying the baseboard management controller corresponding to the remote reset signal, identifying whether the corresponding baseboard management controller requires the restart, and in response to identifying that the corresponding baseboard management controller requires the restart, restarting the corresponding baseboard management controller.

2. The method for controlling a baseboard management controller of a node server according to claim 1, wherein the method further comprises:

in response to detecting that the signal emitted by the watchdog timer is a continuous low-level signal or high-level signal, determining that the signal emitted by the watchdog timer is detected to be the non-square wave signal.

3. The method for controlling a baseboard management controller of a node server according to claim 1, wherein the restarting the baseboard management controller comprises:

transmitting a low-level signal to an external reset pin of the baseboard management controller to cause the baseboard management controller to be restarted.

4. The method for controlling a baseboard management controller of a node server according to claim 3, wherein the transmitting a low-level signal to an external reset pin of the baseboard management controller to cause the baseboard management controller to be restarted comprises:

continuously transmitting the low-level signal to the external reset pin of the baseboard management controller within a predetermined time period to cause the baseboard management controller to be restarted upon detecting the continuous low-level signal within the predetermined time period.

5. The method for controlling a baseboard management controller of a node server according to claim 1, wherein the complex programmable logic device is in communication connection with a reserved pin of the network interface card, and the network interface card transmits the remote reset signal to the complex programmable logic device through the reserved pin.

6. The method for controlling a baseboard management controller of a node server according to claim 5, wherein the network interface card transmits a pulse signal to the complex programmable logic device through the reserved pin, and a low-level signal in the pulse signal is the remote reset signal.

7. The method for controlling a baseboard management controller of a node server according to claim 6, wherein the method further comprises:

receiving the pulse signal transmitted by the network interface card, and performing a filtering process on the pulse signal to obtain the low-level signal in the pulse signal.

8. The method for controlling a baseboard management controller of a node server according to claim 1, wherein the method further comprises:

in response to detecting that the signal emitted by the watchdog timer is the non-square wave signal, setting a state flag bit of the baseboard management controller to a first identifier;

in response to detecting that the signal emitted by the watchdog timer is a square wave signal, setting the state flag bit of the baseboard management controller to a second identifier;

in response to identifying that the state flag bit of the baseboard management controller is the first identifier, determining that the baseboard management controller requires the restart; and in response to identifying that the state flag bit of the baseboard management controller is the second identifier, determining that the baseboard management controller does not require the restart.

9. The method for controlling a baseboard management controller of a node server according to claim 1, wherein the network interface card is further connected to a processor of the node server through a peripheral component interconnect express (PCIE) bus, and the processor of the node server is connected to the baseboard management controller through the PCIE bus; and the network interface card executes an intelligent platform management interface (IPMI) instruction through the processor of the node server to restart the baseboard management controller.

10. A complex programmable logic device, wherein the complex programmable logic device is connected to a baseboard management controller of a node server, and the complex programmable logic device is further connected to a network interface card, wherein the complex programmable logic device is provided therein with a storage unit, a processing unit, and a computer-readable instruction stored in the storage unit and executable on the processing unit, and the processing unit, when executing the computer-readable instruction, is configured to:

detect a signal emitted by a watchdog timer of the baseboard management controller, and restart the baseboard management controller in response to detecting that the signal emitted by the watchdog timer is a non-square wave signal; and in response to receiving a remote reset signal of the baseboard management controller transmitted by the network interface card, identify whether the baseboard management controller requires a restart, and in response to identifying that the baseboard management controller requires the restart, restart the baseboard management controller;

wherein the baseboard management controllers are provided in a plurality, the network interface cards are provided in a plurality, the complex programmable logic device is respectively connected to each of the baseboard management controllers, and the complex programmable logic device is also respectively connected to each of the network interface cards;

wherein restarting the baseboard management controller in response to detecting that the signal emitted by the watchdog timer is the non-square wave signal comprises: restarting any one of the baseboard management controllers in response to detecting that the signal emitted by the watchdog timer of any one of the baseboard management controllers is the non-square wave signal; and wherein in response to receiving the remote reset signal of the baseboard management controller transmitted by the network interface card, identifying whether the baseboard management controller requires the restart, and in response to identifying that the baseboard management controller requires the restart, restarting the baseboard management controller comprises: in response to receiving the remote reset signal transmitted by any one of the network interface cards, identifying the baseboard management controller corresponding to the remote reset signal, identifying whether the corresponding baseboard management controller requires the restart, and in response to identifying that the corresponding baseboard management controller requires the restart, restarting the corresponding baseboard management controller.

11. The complex programmable logic device according to claim 10, wherein the processing unit, when executing the computer-readable instruction, is further configured to:
in response to detecting that the signal emitted by the watchdog timer is a continuous low-level signal or high-level signal, determine that the signal emitted by the watchdog timer is detected to be the non-square wave signal.

12. The complex programmable logic device according to claim 10, wherein the processing unit, when executing the computer-readable instruction, is further configured to:
transmit a low-level signal to an external reset pin of the any one of the baseboard management controllers to cause the any one of the baseboard management controllers to be restarted.

13. A system for controlling a baseboard management controller of a node server, wherein the system for controlling a baseboard management controller of a node server comprises a complex programmable logic device and a network interface card, the network interface card is connected to the complex programmable logic device, and the complex programmable logic device is further connected to the baseboard management controller, wherein
the complex programmable logic device is configured for detecting a signal emitted by a watchdog timer of the baseboard management controller, and restarting the baseboard management controller in response to detecting that the signal emitted by the watchdog timer is a non-square wave signal; and
the complex programmable logic device is configured for in response to receiving a remote reset signal of the baseboard management controller transmitted by the network interface card, identifying whether the baseboard management controller requires a restart, and in response to identifying that the baseboard management controller requires the restart, restarting the baseboard management controller;
the network interface card is a multi-channel network interface card, the network interface cards are provided in a plurality, each of the network interface cards is respectively connected to the complex programmable logic device, each of the network interface cards is further connected to a plurality of baseboard management controllers, and the complex programmable logic device is respectively connected to each of the baseboard management controllers;
the complex programmable logic device detects that the signal emitted by the watchdog timer of any one of the baseboard management controllers is the non-square wave signal, and restarts the any one of the baseboard management controllers; and
when receiving a remote reset signal transmitted by any one of the network interface cards, the complex programmable logic device identifies the baseboard management controller corresponding to the remote reset signal, identifies whether the corresponding baseboard management controller requires the restart, and in response to identifying that the baseboard management controller requires the restart, restarts the corresponding baseboard management controller.

14. The system for controlling a baseboard management controller of a node server according to claim 13, wherein the network interface card is further connected to a processor of the node server, all a peripheral component interconnect express (PCIE) links of the network interface card are connected to a PCIE port of the processor of the node server, and the processor of the node server is connected to the baseboard management controller through a PCIE bus; and
the network interface card executes an intelligent platform management interface (IPMI) instruction through the processor of the node server to restart the baseboard management controller.

15. The system for controlling a baseboard management controller of a node server according to claim 14, wherein a golden finger of the network interface card is connected to the PCIE port of the node server, and the PCIE bus of the node server is connected to the PCIE port of the processor of the node server.

16. The system for controlling a baseboard management controller of a node server according to claim 15, wherein the network interface card emits a sideband signal of the golden finger to the complex programmable logic device through a reserved pin of the network interface card, and the sideband signal of the golden finger functions as the remote reset signal.

17. The system for controlling a baseboard management controller of a node server according to claim 13, wherein a golden finger of each of the network interface cards is inserted into a peripheral component interconnect express (PCIE) port of an adapter board, the adapter board splits a PCIE bus into a plurality of PCIE lines through a cable and is connected to a PCIE port of a processor of each node server through each of the PCIE lines, and the processor of each node server is connected to a corresponding baseboard management controller through the PCIE bus.

18. The system for controlling a baseboard management controller of a node server according to claim 17, wherein the network interface cards are provided in two, the golden fingers of both the two network interface cards are inserted into the PCIE ports of the adapter board, and the adapter board splits a PCIE X16 bus of each of the network interface cards into two PCIE X8 lines through the cable, with each PCIE X8 line connected to the PCIE port of the processor of one node server.

19. The system for controlling a baseboard management controller of a node server according to claim 17, wherein any one of the network interface cards transmits a sideband signal of the golden finger of the any one of the network interface cards to the complex programmable logic device through a reserved pin of the any one of the network interface cards, and the sideband signal of the golden finger of the any one of the network interface cards functions as the remote reset signal emitted by the any one of the network interface cards.

20. The system for controlling a baseboard management controller of a node server according to claim 13, wherein the system for controlling a baseboard management controller of a node server further comprises a management switch connected to the network interface card, and the management switch is configured to control the network interface card to emit the remote reset signal.

\* \* \* \* \*